(12) United States Patent
Dell (10) Patent No.: US 12,466,643 B1
(45) Date of Patent: Nov. 11, 2025

(54) SYSTEMS AND METHODS FOR REMOVING PARTICULATE MATERIAL

(71) Applicant: TRANS-WEST, INC., Brighton, CO (US)

(72) Inventor: Timothy Dell, Red Deer (CA)

(73) Assignee: TRANS-WEST, INC., Brighton, CO (US)

( * ) Notice: Subject to any disclaimer, the term of this patent is extended or adjusted under 35 U.S.C. 154(b) by 0 days.

(21) Appl. No.: 19/180,474

(22) Filed: Apr. 16, 2025

Related U.S. Application Data (60) Provisional application No. 63/714,328, filed on Oct. 31, 2024.

(51) Int. Cl.
| | |
|---|---|
| *B65F 3/18* | (2006.01) |
| *B01D 46/00* | (2022.01) |
| *B01D 46/40* | (2006.01) |
| *B01D 46/48* | (2006.01) |
| *B01D 46/62* | (2022.01) |
| *B65F 1/06* | (2006.01) |

(52) U.S. Cl.
CPC ............ *B65F 3/18* (2013.01); *B01D 46/0005* (2013.01); *B01D 46/403* (2013.01); *B01D 46/62* (2022.01); *B65F 1/06* (2013.01); *B01D 46/48* (2013.01); *B01D 2259/455* (2013.01); *B65F 2240/00* (2013.09)

(58) Field of Classification Search
None
See application file for complete search history.

(56) References Cited

U.S. PATENT DOCUMENTS

| | | | | |
|---|---|---|---|---|
| 2,901,133 | A * | 8/1959 | Weller | ...................... B60P 3/24 |
| | | | | 406/119 |
| 3,077,986 | A * | 2/1963 | O'Neal et al. ....... | B01D 21/267 |
| | | | | 55/343 |
| 3,374,910 | A * | 3/1968 | Hermanns | ............... B60P 3/243 |
| | | | | 406/109 |
| 3,842,461 | A * | 10/1974 | Wurster | .................... E03F 7/10 |
| | | | | 55/467 |

(Continued)

FOREIGN PATENT DOCUMENTS

EP          0434007 A2 *  6/1991   ............. B01D 50/20

*Primary Examiner* — Brit E. Anbacht
(74) *Attorney, Agent, or Firm* — Fennemore Craig, P.C.

(57) ABSTRACT

A material removal system includes a collection conduit having a distal end that is positionable adjacent particulate material. A primary particle separator system connected to the collection conduit separates quantities of particulate material entrained in an air stream. A secondary particle separator system connected to an outlet of the primary particle separator system separates additional quantities of particulate material entrained in an air stream exiting the primary particle separator system. An air pump connected to an outlet of the secondary particle separator system creates an airflow through the collection conduit and the primary and secondary particle separator systems. A conveyor system operatively associated with material discharge ports of the primary and secondary particle separator systems collects separated particulate material from the material discharge ports of the primary and secondary particle separator systems and transports the separated particulate material to a material discharge end of the conveyor system.

30 Claims, 8 Drawing Sheets

(56) References Cited

U.S. PATENT DOCUMENTS

| | | | | |
|---|---|---|---|---|
| 4,016,994 | A * | 4/1977 | Wurster | B60P 1/60 |
| | | | | 96/403 |
| 4,482,367 | A * | 11/1984 | Howeth | B01D 46/0046 |
| | | | | 406/173 |
| 4,574,420 | A * | 3/1986 | Dupre | E01H 1/0836 |
| | | | | 15/352 |
| 5,425,188 | A * | 6/1995 | Rinker | B01D 46/0002 |
| | | | | 175/206 |
| 6,189,474 | B1 * | 2/2001 | Stewart | B07B 7/06 |
| | | | | 114/222 |
| 11,801,785 | B2 * | 10/2023 | Meyer | B60P 3/2245 |
| 12,330,865 | B1 * | 6/2025 | Day | B65F 1/06 |
| 2003/0131571 | A1 * | 7/2003 | Demarco | B01D 45/16 |
| | | | | 55/324 |
| 2007/0226950 | A1 * | 10/2007 | Demarco | B01D 45/12 |
| | | | | 15/345 |
| 2007/0227105 | A1 * | 10/2007 | Jacobson | B04C 5/26 |
| | | | | 55/345 |
| 2012/0291813 | A1 * | 11/2012 | Schmidt, Jr. | B65F 1/105 |
| | | | | 134/21 |
| 2020/0054980 | A1 * | 2/2020 | Sutton | B01D 46/2403 |

\* cited by examiner

SYSTEMS AND METHODS FOR REMOVING PARTICULATE MATERIAL

CROSS-REFERENCE TO RELATED APPLICATION

This application claims the benefit of U.S. Provisional Patent Application No. 63/714,328, filed on Oct. 31, 2024, which is hereby incorporated herein by reference for all that it discloses.

TECHNICAL FIELD

The present invention relates to excavation systems in general and more specifically to systems and methods for removing particulate material from a job site.

BACKGROUND

Various types of trenching processes and devices have been used for decades to provide underground pathways or conduits for various types of underground assets and utilities, such as water, sewer, electricity, and of late, fiber optic communication systems. A more recent trenching process, known generally as 'micro trenching,' digs or forms a trench having a relatively small width, typically on the order of a few centimeters, and modest depth, typically on the order of a few tens of centimeters. Micro trenching processes are commonly used in the laying of fiber optic communications cables, often adjacent or underneath existing roadways.

Micro trenching processes can be rapidly performed with a minimum of disruption. For example, where micro trenching processes are used to lay conduit adjacent or beneath roadways, there is little to no traffic disruption because of the small trench widths and depths involved. That is, there is typically no need to temporarily cover the open trench, e.g., with steel plate, as cars, trucks, and even pedestrians can easily traverse the narrow trenches. Moreover, very soon after the desired asset or utility is placed within the trench, the trench may be backfilled with a suitable material or grout compound, thereby minimizing the time during which the open trench is exposed.

In most micro trenching operations, a continuous excavator or 'micro trencher' is used to form the trench. Excavated material or spoil produced by the continuous excavator is usually deposited adjacent the trench during formation. However, because the excavated material or spoil is not typically used to backfill the trench after the installation of the desired underground asset, the excavated material must be removed from the job site and hauled away to a different location for dumping or use for another purpose. While various types of vacuum trucks and trailers are typically used for this purpose, the tanks that receive and hold the excavated material have limited capacities. Consequently, a vacuum truck or trailer used to collect the excavated material must be periodically removed from the job site and taken to the dumping location so the tank can be emptied. Of course, the requirement to periodically remove the vacuum truck or trailer for emptying limits the productivity of the micro trenching operation. For example, it is usually not desirable for the continuous excavator to outpace the ability to remove the spoil. Therefore, the trenching operation may be slowed or stopped while awaiting the return of the vacuum truck or trailer.

While it is possible to provide multiple vacuum trucks or trailers so that an empty truck or trailer is always available to remove the excavated material, the provision of multiple vacuum trucks or trailers significantly increases the cost of the micro trenching operation, not only as a consequence of the additional trucks or trailers required, but also because the vacuum trucks and trailers themselves are expensive to acquire and operate. In addition, many vacuum trucks or trailers are quite large and heavy and often require special licenses for the drivers of the vacuum trucks or heavy duty tow vehicles (e.g., in the case of vacuum trailers), thereby further increasing costs. In any event, need to periodically remove the vacuum trucks or trailers from the job site for dumping or the need to provide multiple vacuum trucks or trailers represents inefficiencies and sub-optimal use of materials, equipment, and resources.

SUMMARY

One embodiment of a material removal system according to the disclosed instrumentalities may include a collection conduit having a distal end that is positionable adjacent particulate material. A primary particle separator system operatively connected to a proximal end of the collection conduit separates quantities of particulate material entrained in an air stream entering the primary particle separator system. A secondary particle separator system operatively connected to an outlet of the primary particle separator system separates additional quantities of particulate material entrained in an air stream exiting an outlet of the primary particle separator system. An air pump operatively connected to an outlet of the secondary particle separator system creates an airflow through the collection conduit and the primary and secondary particle separator systems. A conveyor system operatively associated with material discharge ports of the primary and secondary particle separator systems collects separated particulate material from the material discharge ports of the primary and secondary particle separator systems and transports the separated particulate material to a material discharge end of the conveyor system.

A method of removing particulate material may involve providing the material removal system; operating the air pump of the material removal system to initiate a flow of air through the collection conduit and the primary and secondary particle separator systems; and positioning the distal end of the collection conduit adjacent the particulate material so that the particulate material is entrained with air drawn into the inlet of the primary particle separator system, wherein the particulate material is separated from the air by the primary and secondary particle separator systems and substantially continuously discharged by the conveyor system.

Also disclosed is a material removal system for removing particulate material that includes a vehicle and a primary particle separator system mounted to the vehicle. The primary particle separator system includes an inlet, an outlet, and a material discharge port and separates quantities of particulate material entrained in an air stream entering the inlet of the primary particle separator system. A proximal end of a collection conduit is operatively connected to the inlet of the primary particle separator system. A distal end of the collection conduit is positionable adjacent the particulate material. An inlet of a secondary particle separator is operatively connected to the outlet of the primary particle separator system so that the secondary particle separator system separates additional quantities of particulate material entrained in an air stream exiting the outlet of the primary particle separator system. An inlet of an air pump is operatively connected to an outlet of the secondary particle separator system. A conveyor system operatively associated with material discharge ports of the primary and secondary particle separator systems collecting separated particulate material from the material discharge ports and transports the separated particulate material to a material discharge end of the conveyor system.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

The following is a detailed description of exemplary embodiments that illustrate the principles of the disclosed instrumentalities. The embodiments are provided to illustrate various aspects of the disclosed instrumentalities. However, the disclosed instrumentalities should not be regarded as limited to any particular embodiment or combination of features. The disclosed instrumentalities teach by way of example and not by limitation. Therefore, the scope of the disclosed instrumentalities encompasses numerous alternatives, modifications, and equivalents.

Figure 1:
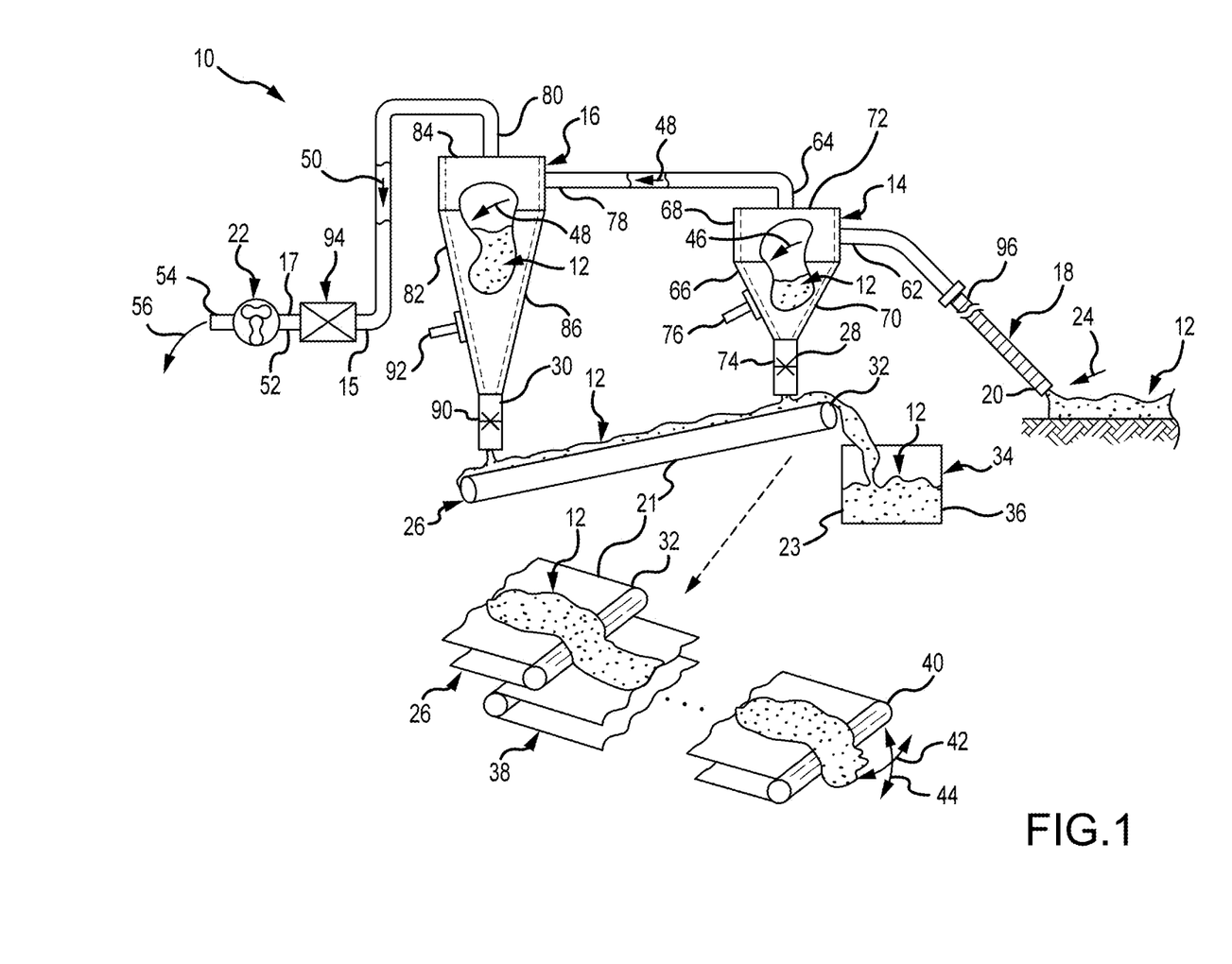
FIG. 1 is a schematic depiction of a material removal system according to the disclosed instrumentalities.

One embodiment of a material removal system 10 is shown in FIG. 1 as it may be used to remove particulate material, such as, for example, sand, gravel, dirt, and mixtures thereof. In the particular example embodiments shown and described herein, the particulate material that may be removed by the disclosed instrumentalities may comprise excavated material or spoil 12 produced by a trenching or micro trenching operation in which a continuous excavator (not shown) is used to form a trench (also not shown), depositing the excavated material 12 alongside the formed trench. Briefly, material removal system 10 may include a primary particle separator system 14 and a secondary particle separator system 16 connected in series with primary particle separator system 14. A collection conduit 18 operatively connected to primary particle separator system 14 includes a distal end 20 that is positionable adjacent excavated material 12 so that the same may be collected thereby.

An air pump or blower assembly 22 operatively connected to secondary particle separator system 16 initiates a flow of air through primary and secondary particle separator systems 14 and 16. When distal end 20 of collection conduit 18 is positioned nearby excavated material 12, air, depicted by arrow 24, entering distal end 20 of collection conduit 18 picks up quantities of excavated material 12, which is thereafter separated or removed from air 24 by primary and secondary particle separator systems 14 and 16.

Material removal system 10 may also include a conveyor system 26 operatively associated with material discharge ports 28 and 30 of primary and secondary particle separator systems 14 and 16, respectively. Conveyor system 26 receives separated excavated material 12 from the material discharge ports 28 and 30 and carries or transports excavated material 12 to a material discharge end 32 of conveyor system 26. Material discharge end 32 of conveyor system 26 substantially continuously discharges separated excavated material 12 from material discharge ports 28 and 30 of primary and secondary particle separator systems 14 and 16.

Material removal system 10 may also comprise a material collection system 34. Material collection system 34 may be operatively associated with material discharge end 32 of conveyor system 26 and receives separated excavated material 12 discharged thereby. In some embodiments, material collection system 34 may comprise one or more containers 36 for holding a defined quantity of excavated material 12. When a container 36 is filled with separated excavated material 12, container 36 can simply be removed and replaced by an empty container 36. The new (i.e., empty) container 36 can be filled without significantly interrupting the operation of the material removal system 10. The removed but now filled container 36 may be placed in a suitable receiving area (not shown) for transport to a disposal site at any convenient time.

Still referring to FIG. 1, in some embodiments, material removal system 10 may be provided with a secondary conveyor system 38. As will be explained in further detail below, secondary conveyor system 38 may be used in addition to, or as a substitute for, material collection system 34. Secondary conveyor system 38 may be mounted adjacent discharge end 30 of conveyor system 26 so that secondary conveyor system 38 receives excavated material 12 discharged thereby. Secondary conveyor system 38 may be pivotally mounted with respect to conveyor system 26 so that a material discharge end 40 of secondary conveyor system 38 is moveable horizontally and/or vertically with respect to the material discharge end 32 of conveyor system 26. Horizontal movement of material discharge end 40 of secondary conveyor system 38 allows material discharge end 40 to be swung in an arc (i.e., as indicated by arrows 42) between the left and right-hand sides of conveyor system 26. Vertical movement of material discharge end 40 of secondary conveyor system 38 allows material discharge end 40 to be raised and lowered (i.e., as indicated by arrows 44) with respect to material discharge end 32 of conveyor system 26.

Secondary conveyor system 38 therefore allows excavated material 12 to be discharged into a truck or trailer (not shown) positioned alongside (e.g., either to the left or right) of material removal system 10. Use of secondary conveyor system 38 along with a movable truck or trailer allows material removal system 10 to be moved along the pile of excavated material 12 substantially continuously, i.e., along with the movement of the continuous s excavator of the trenching process. In other embodiments, material collection system 34 may be positioned adjacent discharge end 40 of secondary conveyor system 38 to collect discharged excavated material 12 into removable containers 36 in the manner already described for conveyor system 26.

Material removal system 10 may be used as follows to remove particulate material, such as excavated material 12 produced by a trenching or micro trenching operation. After the material removal system 10 has been provided to the job site of the trenching operation, air pump 22 may be activated to initiate a flow of air through the material removal system 10. In the particular embodiments shown and described herein, wherein air pump 22 is downstream of both primary and secondary particle separator systems 14 and 16, operation of air pump 22 will serve to draw air, indicated by arrow 24, into distal end 20 of collection conduit 18. Thus, when distal end 20 of collection conduit 18 is positioned adjacent excavated material 12, air 24 entering distal end 20 of collection conduit 18 will pick up and entrain quantities of excavated material 12, carrying it to primary particle separator system 14 as a loaded air stream 46.

Primary particle separator system 14 separates quantities of excavated material 12 entrained in loaded air stream 46, resulting in the formation of a partially-loaded air stream 48. Separated excavated material 12 from primary particle separator system 14 is ultimately discharged via material discharge port 28, whereupon it is carried away by conveyor system 26 before being discharged to material collection system 34 and/or secondary conveyor system 38, as the case may be.

Partially-loaded air stream 48 exiting primary particle separator system 14 still contains some amount of particulate material, e.g., excavated material 12, entrained therein. Upon entering secondary particle separator system 16, secondary particle separator system 16 separates additional quantities of excavated material 12 entrained in partially loaded air stream 48, resulting in the formation of a substantially barren or depleted air stream 50. Separated excavated material 12 from secondary particle separator system 16 is ultimately discharged via material discharge port 30 of secondary particle separator system 16, whereupon it is carried away by conveyor system 26 before being discharged or deposited into material collection system 34 and/or secondary conveyor system 38. Thereafter, barren or depleted air stream 50 enters inlet 52 of air pump system 22 before being discharged to the atmosphere via outlet 54 as discharged air steam 56.

A significant advantage of material removal system 10 is that it may be used to remove particulate material, such as excavated material 12 produced by a trenching or micro trenching operation, on a substantially continuous basis, i.e., without having to pause the material collection process to empty the collection tank of a vacuum truck or trailer. Instead, as each container 36 of collection system 34 is filled, it may simply be removed and replaced with an empty container 36. Filled containers 36 may be placed in a suitable receiving area for transport to a disposal site at any convenient time. In embodiments wherein material removal system 10 includes a secondary conveyor system 38, excavated material 12 discharged by conveyor system 26 may be carried by secondary conveyor system 38 to an alternative discharge location, such as a truck or trailer, positioned alongside material removal system 10. In some embodiments, material collection system 34 may be located on a truck or trailer thereby allowing the containers 36 to be filled on the truck or trailer.

Still other advantages are associated with the use of containers 36 to collect the excavated material 12. Besides providing for the convenient collection and removal of the excavated material 12 during operation, filled containers 36 do not add to the overall weight of the material collection system 10, thereby allowing lighter duty trucks or trailers to be used. That is, the truck or trailer used to carry material removal system 10 need not be designed or configured to carry a great weight of excavated material (other than that being collected by primary and secondary particle separator systems 14 and 16), as the collected excavated material 12 may be held elsewhere. The ability to use such lighter duty vehicles or trailers reduces the overall cost of the material collection system 10 and may dispense with the need for operators of the vehicles to be specially licensed.

Still yet other advantages are associated with the two-stage particle separation process provided by primary and secondary particle separator systems 14 and 16. For example, the two-stage particle separation process allows for the efficient separation and removal of the particulate material (e.g., excavated material 12) from loaded air stream 46. Primary particle separator system 14 removes a first amount or quantity of the excavated material 12, while secondary particle separator system 16 removes additional quantities of excavated material 12.

Moreover, and as will be described in much greater detail below, in some embodiments primary particle separator system 14 may be configured to have a coarse particle 'cut-point,' specifically configured to remove the larger or coarser particles from loaded air stream 46. Secondary particle separator system 16 may be provided with a finer particle cut-point, specifically configured to remove the smaller or finer-sized particles from partially loaded airstream 48. The use of primary and secondary particle separator systems 14 and 16 having two different cut-points further improves the efficiency of the two-stage particle separation process.

Having briefly described certain embodiments and variations of the material removal system 10 according to the disclosed instrumentalities, as well as some of its more significant features or advantages, various embodiments and alternative configurations of the material removal system according to the disclosed instrumentalities will now be described in detail. However, before proceeding with the description it should be noted that while the disclosed instrumentalities are shown and described herein as they could be mounted to a self-propelled vehicle (e.g., a truck) and used to remove excavated material produced during a micro trenching operation, the disclosed systems and methods could be used in conjunction with a wide range of vehicles, i.e., either self-propelled vehicles or trailers, and in any of a wide range of applications wherein it would be advantageous or desirable to remove particulate material on a substantially continuous basis. Consequently, the disclosed instrumentalities should not be regarded as limited to use with any particular type or style of vehicle or trailer nor to any particular type of operation resulting in the production of particulate material that must be removed.

Referring back now primarily to FIG. 1 and with general reference to FIGS. 2-6, material removal system 10 is shown and described herein as it could be mounted on a self-propelled vehicle 58, such as a truck 60. Material removal system 10 can thereby be readily moved from site-to-site for the removal of excavated material 12. In addition, mounting material removal system 10 on such a self-propelled vehicle 58 allows it to be moved along with the trenching operation, removing the excavated material 12 along the way. However, it should be noted that in other embodiments, material removal system 10 may be mounted to a trailer (not shown). A suitable tow vehicle (also not shown) may be used to move trailer carrying the material removal system from site-to-site and to move it along with the trenching operation.

In any event, and regardless of whether material removal system 10 is mounted to a self-propelled vehicle 58 or a trailer, material removal system 10 may comprise primary and secondary particle separator systems 14 and 16 that are connected in series, i.e., so that secondary particle separator system 16 is downstream from primary particle separator system 14. As described above, primary particle separator system 14 separates quantities of particulate material, such as, for example, excavated material 12, from loaded air stream 46. Secondary particle separator system 16 separates additional quantities of particulate material, e.g., excavated material 12, from partially loaded air stream 48 discharged by primary particle separator system 14.

More specifically, primary particle separator system 14 may comprise an inlet 62 and an outlet 64. Loaded air stream 46, e.g., containing excavated material 12 entrained therein, enters primary particle separator system 14 via inlet 62. Primary particle separator system 14 separates quantities of excavated material 12 from loaded air stream 46 and discharges the separated excavated material 12 via material discharge port 28. However, primary particle separator system 14 does not remove all of the excavated material 12 from loaded air stream 46. Some amount of the particulate material 12 remains and is discharged via outlet 64 as partially loaded air stream 48.

In some embodiments, primary particle separator system 14 may comprise a primary cyclone separator 66 having a generally cylindrically-shaped upper portion 68 and a generally conically-shaped lower portion 70. Cyclone separators separate or divide airborne particles by subjecting them to high centrifugal forces and opposing air flows. Centrifugal forces dominate the dynamics of larger particles, whereas aerodynamic drag forces dominate the dynamics of smaller particles. In a cyclone separator, larger particles are thrown outwardly by centrifugal forces (e.g., produced by a vortex (not shown) internal to the cyclone separator) and are therefore effectively separated from smaller particles, which remain entrained in the air.

In the particular embodiments shown and described herein, inlet 62 is provided on upper portion 68 of primary cyclone separator 66. Inlet 62 is configured and arranged so that loaded air stream 46 enters upper portion 68 in a substantially tangential direction. Outlet 64 is also provided on upper portion 68. Outlet 64 is configured and arranged so that partially loaded air stream 48 is withdrawn from upper portion 68 in a substantially axial direction, generally at or near the central portion 72 of upper portion 68. The tangential entry of loaded air stream 46 and axial withdrawal of partially loaded air stream 48 establishes a vortex (not shown) within cyclone separator 66 that effects the separation of the entrained particulate material (e.g., excavated material 12) from loaded air stream 46. The separated excavated material 12 is collected in lower portion 70 of primary cyclone separator 66 before being discharged via material discharge port 28.

Primary cyclone separator 66 may be provided with additional or ancillary systems and devices as may be required or desired for any particular application. For example, primary cyclone separator 66 may be provided with an airlock valve 74 operatively associated with material discharge port 28. Airlock valve 74 permits the removal of the separated excavated material 12 while maintaining the required pressures and air flows within primary cyclone separator 66. Primary cyclone separator 66 also may be provided with a vibrator system 76. Vibrator system 76 may be operatively mounted to lower portion 70 of primary cyclone separator 66, although other locations may be used. Vibrations produced by vibrator system 76 help to reduce or prevent the build-up of separated excavated material 12 on the interior surfaces of primary cyclone separator 66 and otherwise enhance the discharge of the separated excavated material 12 from primary cyclone separator 66.

Secondary particle separator system 16 may comprise an inlet 78 and an outlet 80. Inlet 78 of secondary particle separator system 16 is operatively connected to outlet 64 of primary particle separator system 14 so that secondary particle separator system 16 receives partially loaded air stream 48 discharged by outlet 64 of primary particle separator system 14. Additional quantities of excavated material 12 separated from partially loaded air stream 48 by secondary particle separator system 16 are discharged by material discharge port 30. Depleted or barren air steam 50, i.e., substantially devoid of particulate material, is then discharged via outlet 80 of secondary particle separator system 16.

In the particular embodiments shown and described herein, secondary particle separator system 16 comprises a secondary cyclone separator 82 having a generally cylindrically-shaped upper portion 84 and a generally conically-shaped lower portion 86. In the particular embodiments shown and described herein, inlet 78 is provided on upper portion 84 of secondary cyclone separator 82. Inlet 78 is configured and arranged so that partially loaded air stream 48 enters upper portion 84 in a substantially tangential direction. Outlet 80 is also provided on upper portion 84 and is configured and arranged so that depleted or barren air stream 50 is withdrawn from upper portion 84 in a substantially axial direction, preferably at or near a central portion 88 of upper portion 84. As was the case for primary cyclone separator 66, the tangential entry of partially loaded air stream 48 and axial departure of depleted air stream 50 establishes a vortex (not shown) within secondary cyclone separator 82 that effects the separation of the entrained excavated material 12. The separated excavated material 12 is collected in lower portion 86 before being discharged via material discharge port 30.

Secondary cyclone separator 82 also may be provided with additional or ancillary systems and devices as may be required or desired for any particular application. For example, secondary cyclone separator 82 may be provided with an airlock valve 90 operatively associated with material discharge port 30. Airlock valve 90 permits the removal of the separated excavated material 12 while maintaining the required pressures and air flows within secondary cyclone separator 82. Secondary cyclone separator 82 also may be provided with a vibrator system 92 operatively mounted to lower portion 86 of secondary cyclone separator 82. Alternatively, vibrator system 92 may be mounted to other locations of secondary cyclone separator 82. Vibrations produced by vibrator system 92 help to reduce or prevent the build-up of separated excavated material 12 on the interior surfaces of secondary cyclone separator 82 and otherwise enhance the discharge of the separated excavated material 12.

It is generally preferred, but not required, that primary and secondary particle separator systems 14 and 16 be provided with different particle size separation or 'cut-points' to facilitate efficient operation of material removal system 10. For example, in the particular embodiments shown and described herein, primary particle separator system 14 is sized and configured so that it has a coarse particle size cut-point, thereby allowing primary particle separator system 14 to efficiently remove larger sized particles (i.e., at and above the designed cut-point). Secondary particle separator system 16 is sized and configured so that it has a fine particle size cut-point, thereby allowing secondary particle separator system 16 to efficiently remove smaller sized particles. The series arrangement of the primary and secondary particle size separators 14 and 16 substantially removes from the air stream nearly all the particulate material (e.g., down to about 10 microns or so in size in some embodiments), leaving only the smallest particles (e.g., those less than about 10 microns or so) remaining in barren or depleted air stream 50 (FIG. 1). Any remaining particles (e.g., the fines) may be removed by a particulate filter assembly 94, as will be explained in further detail below.

Figure 5:
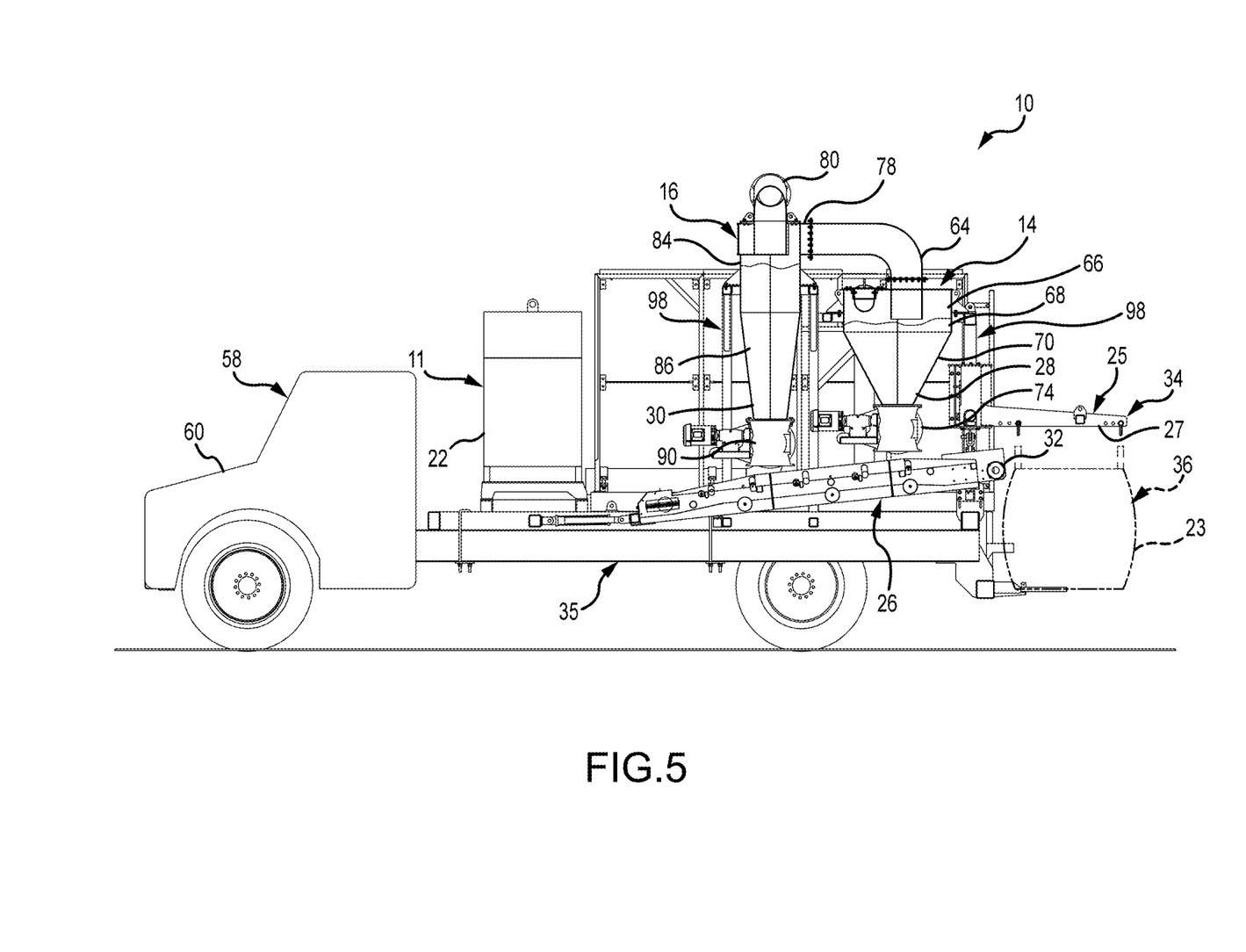
FIG. 5 is a left side view in elevation of the material removal system illustrated in FIG. 4.

In embodiments wherein the primary and secondary particle separator systems 14 and 16 comprise respective primary and secondary cyclone separators 66 and 82, the different cut points of each cyclone separator may be achieved by providing the primary and secondary cyclone separators 66 and 82 with different overall sizes and configurations, as best seen in FIGS. 1 and 5. When so sized and configured, primary cyclone separator 66 will remove a substantial portion of the coarse or larger sized particles of the excavated material 12, whereas secondary cyclone separator 82 will remove the finer fraction.

As briefly mentioned earlier, material removal system 10 may also comprise a collection conduit 18 (FIG. 1). Proximal end 96 of collection conduit 18 is operatively connected to inlet 62 of primary particle separator system 14, whereas distal end 20 is positionable adjacent excavated material 12. Excavated material 12 entrained in air 24 entering distal end 20 of collection conduit 18 is thereby conveyed to primary particle separator system 14 by collection conduit 18. In some embodiments, collection conduit 18 may comprise an integral portion of inlet 62 of primary particle separator system 14. In other embodiments, collection conduit 18 may comprise a separate element or component that may be removably attached to inlet 62 of primary particle separator system 14.

To facilitate the easy positioning of distal end 20 of collection conduit 18 adjacent excavated material 12, it is generally preferred, but not required, that at least distal end 20, if not the entirety, of collection conduit 18 comprise a flexible hose. If desired, distal end 20 of collection conduit 18 may be provided with one or more handles (not shown) to allow an operator to manually position distal end 20 adjacent excavated material 12 for the removal of same. In other embodiments, distal end 20 may be mounted to a wheeled trolley (also not shown) to allow distal end 20 to be moved along excavated material 12 as the same is gradually and substantially continuously removed by material removal system 10. In still yet other embodiments, distal end 20 of collection conduit 18 may be mounted to a support system (also not shown) structured and arranged to hold distal end 20 adjacent excavated material 12. Such a support system may be mounted to material removal system 10, support frame 98 of material removal system 10, or to vehicle 58. Still other arrangements for positioning distal end 20 of collection conduit 18 adjacent excavated material 12 are possible, as would become apparent to persons having ordinary skill in the art after having become familiar with the teachings provided herein. Consequently, the disclosed instrumentalities should not be regarded as limited to any particular structure or methods of positioning distal end 20 of collection conduit 18 adjacent excavated material 12.

As briefly described earlier, material removal system 10 may also comprise air pump or blower assembly 22, as best seen in FIG. 1 (blower assembly 22 is not visible in FIGS. 2-6—it is provided within housing 11). Inlet 52 of air pump assembly 22 may be operatively connected to outlet 80 of secondary particle separator system 16, as also best seen in FIG. 1. Air from pump assembly 22 may be discharged via outlet 54 as discharged air stream 56. As briefly described earlier, when operated, air pump assembly 22 initiates a flow of air through primary and secondary particle separator systems 14 and 16. When distal end 20 of collection conduit 18 is positioned nearby excavated material 12, air 24 entering distal end 20 of collection conduit 18 picks up quantities of excavated material 12, which is thereafter removed by primary and secondary particle separator systems 14 and 16.

In some embodiments, air pump or blower assembly 22 may comprise a positive displacement pump, such as a rotary lobe or screw type blower. Alternatively, other types of air pumps or blowers may also be used, as would become apparent to persons having ordinary skill in the art after having become familiar with the teachings provided herein. In any event, air pump 22 should also have sufficient capacity, i.e., in terms of pressure differential and flow rate, to operate the particular primary and secondary particle separator systems 14 and 16 involved, as would become apparent to persons having ordinary skill in the art after having become familiar with the teachings provided herein. Consequently, the disclosed instrumentalities should not be regarded as limited to an air pump 22 having any particular capacity or flow rate.

Some embodiments of material removal system 10 may be provided with a particulate filter assembly 94 to remove any fine particulate material (e.g., smaller than about 10 microns in some embodiments) remaining in depleted air stream 50. More specifically, an inlet 15 of particulate filter assembly 94 is operatively connected to outlet 80 of secondary particle separator system 16, whereas an outlet 17 of particulate filter assembly 94 is operatively connected to inlet 52 of air pump assembly 22. Particulate filter assembly 92 thereby filters depleted air stream 50 before it enters pump assembly 22. Filtered air 56 may then be discharged via outlet 54 of air pump 22.

With reference now primarily to FIGS. 1 and 5, conveyor system 26 is operatively associated with material discharge ports 28 and 30 of primary and secondary particle separator systems 14 and 16, respectively. In embodiments wherein primary and secondary particle separator systems 14 and 16 are provided with respective primary and secondary air lock valves 74 and 90, then conveyor system 26 will be operatively associated with airlock valves 74 and 90 so that conveyor system 26 receives excavated material 12 discharged thereby. In any event, conveyor system 26 receives separated excavated material 12 from primary and secondary particle separator systems 14 and 16 and carries or transports the excavated material 12 to material discharge end 32. Material discharge end 32 of conveyor system 26 substantially continuously discharges the separated excavated material 12 from primary and secondary particle separator systems 14 and 16. In the particular embodiments shown and described herein, conveyor system 26 may comprise a belt conveyor system in which an endless belt 21 is used to carry excavated material 12. Alternatively, other types of conveyor systems may be used as well, as would become apparent to persons having ordinary skill in the art after having become familiar with the teachings provided herein.

With reference now primarily to FIGS. 1-3 and 5, material collection system 34 of material removal system 10 is operatively associated with discharge end 32 of conveyor system 26 and receives the separated excavated material 12 discharged thereby. In some embodiments, material collection system 34 may comprise one or more containers 36 for holding a defined quantity of excavated material 12. When a container 36 is filled with the separated excavated material 12, it can simply be removed and replaced with an empty container 36. Empty container 36 can be filled without significantly interrupting the operation of the material removal system 10. The removed but now filled container 36 may be placed in a suitable receiving area (not shown) for transport to a disposal site at any convenient time.

Container 36 may comprise any of a wide range of containers, such as flexible (e.g., fabric) bags 23, suitable for holding excavated material 12. Flexible bags 23 have the advantage of being relatively light and occupying minimal volume when empty (e.g., collapsible), yet capable of holding a significant amount (e.g., volume) of excavated material. Alternatively, of course, other types of containers 36, such as rigid containers or hoppers, may also be used.

Figure 2:
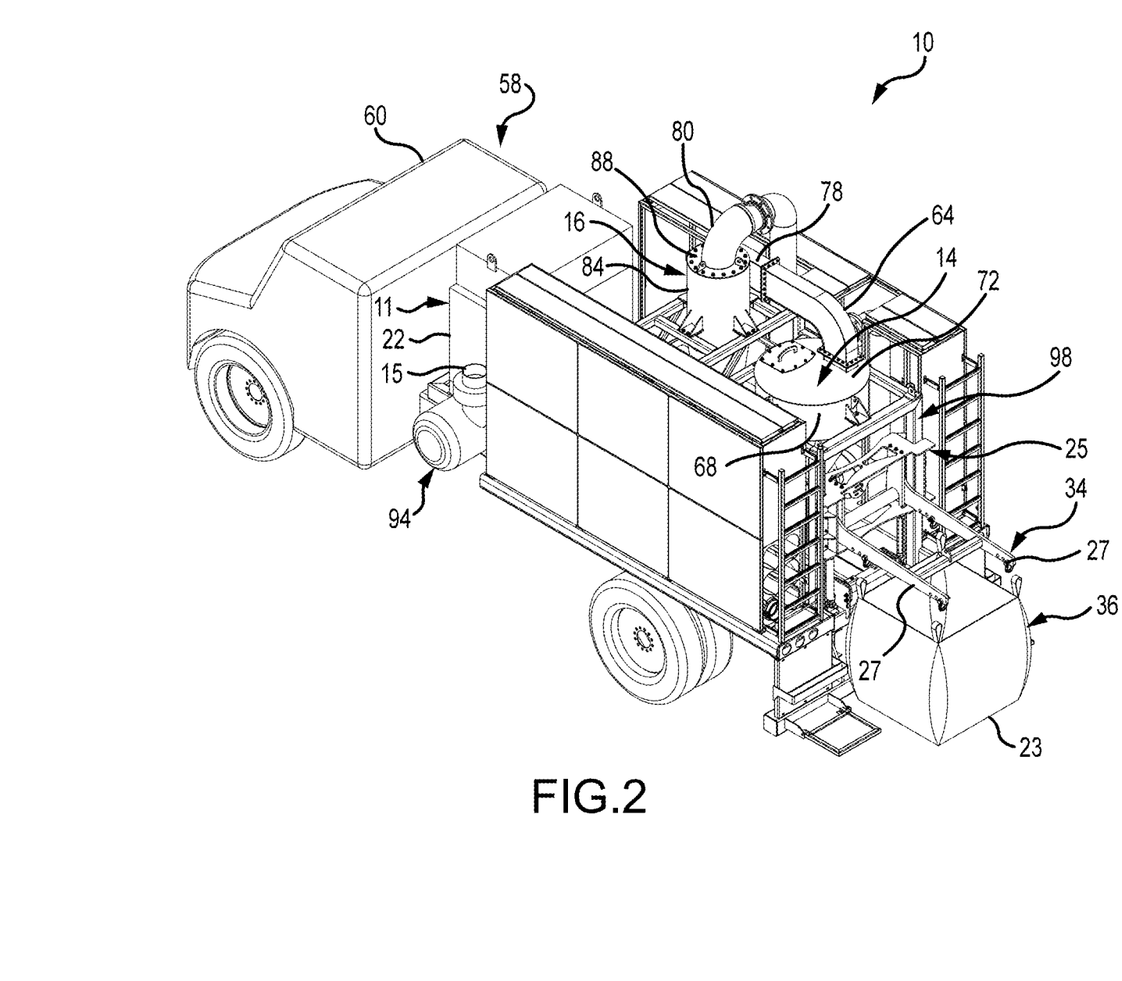
FIG. 2 is a left side view in perspective of an embodiment of the material removal system fitted on a truck chassis.
Figure 3:
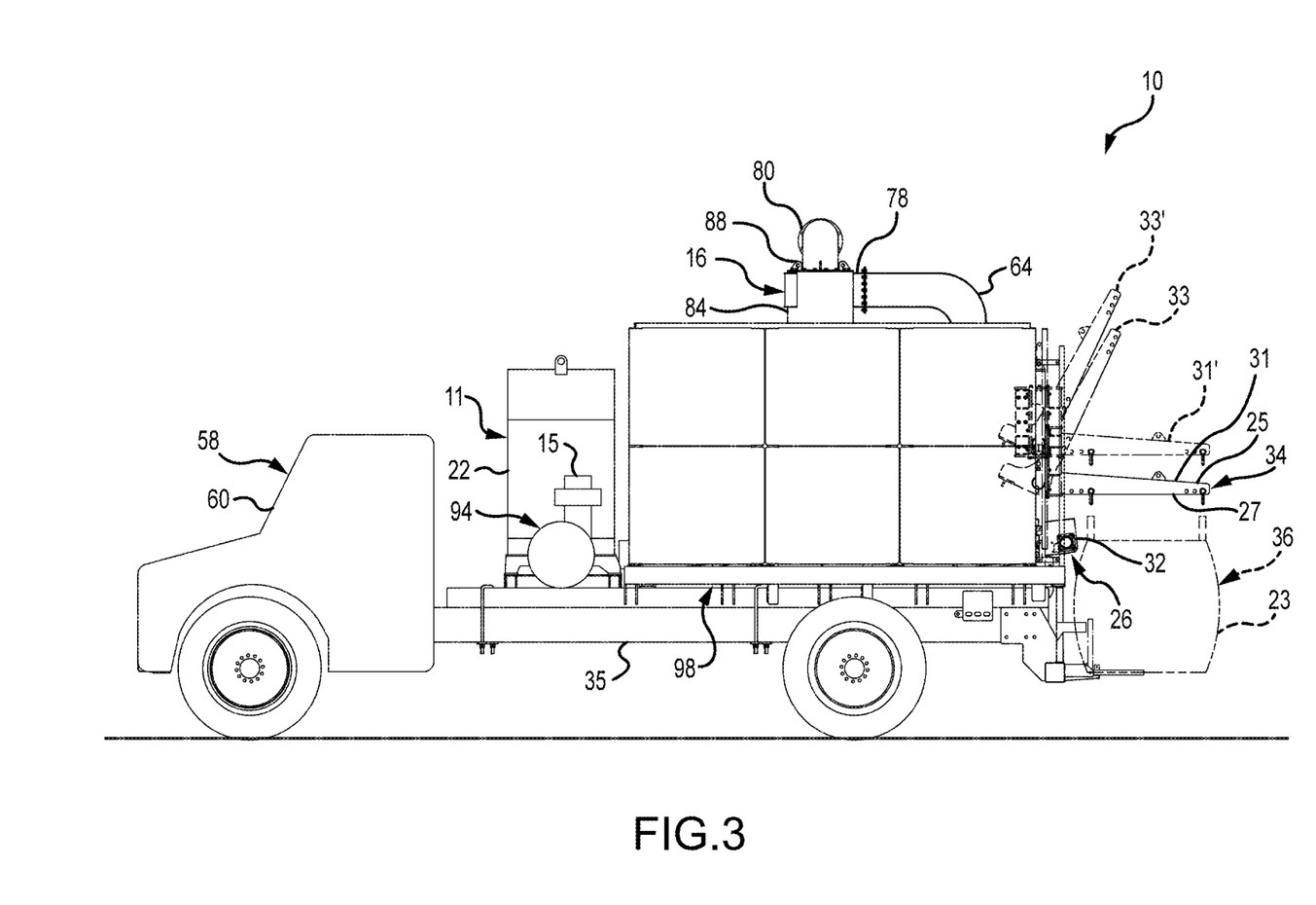
FIG. 3 is left side view in elevation of the material removal system illustrated in FIG. 2 showing the arms of the container support system in various positions.
Figure 4:
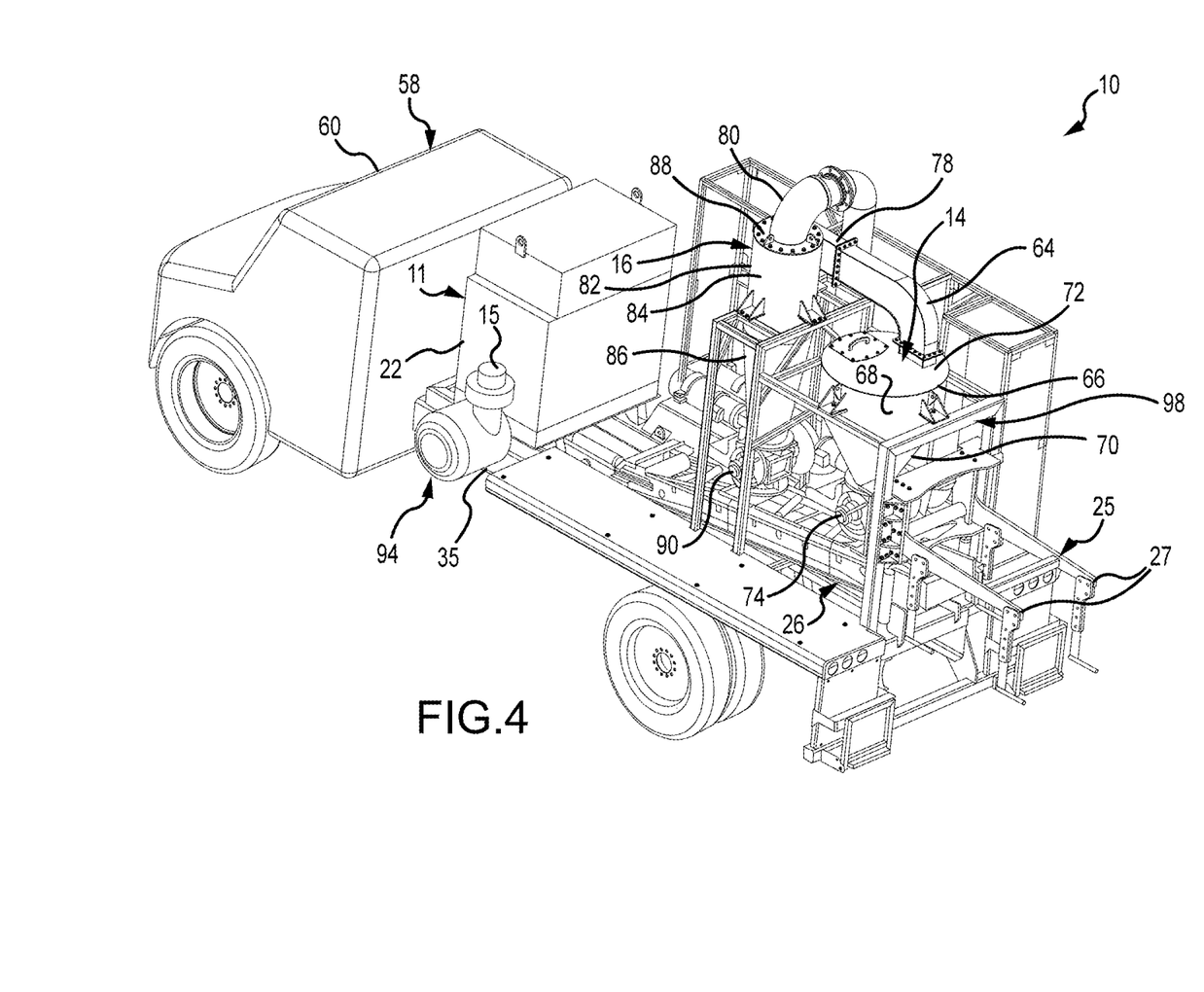
FIG. 4 is a left side view in perspective of the material removal system illustrated in FIG. 2 with the left-hand side storage compartment removed to more clearly show the components of the material removal system and support frame.

Referring now to FIGS. 2-7, in some embodiments, material collection system 34 may comprise a container support system 25. Container support system 25 holds and supports container 36 (e.g, such as bag 23) adjacent discharge end 32 of conveyor system 26. In the particular embodiments shown and described herein, container support system 25 may comprise a pair of support arms 27 positioned in generally parallel, spaced-apart relation. Support arms 27 may be pivotally mounted to a frame 29 of container support system 25 so that support arms 27 may be moved between a lowered position 31 and a raised position 33, as best seen in FIG. 3. In some embodiments, frame 29 of container support system 25 is movably mounted to support frame 98 of material removal system 10 so that support arms 27 may be translated (i.e., moved vertically) between a bottom position and a top position, as best seen in FIGS. 2-4, thereby allowing support arms 27 to be pivoted between respective positions 31' and 33' when frame 29 is raised to the top position. In any event, when support arms 27 are pivoted to the lowered position 31 or 31' they may be used to hold and support container 36 (e.g., bag 23) beneath discharge end 32 of conveyor system 26 so that excavated material 12 discharged thereby may be received by container 36. Support arms 27 may be pivoted to the raised position 33 for travel or for other reasons.

Figure 8:
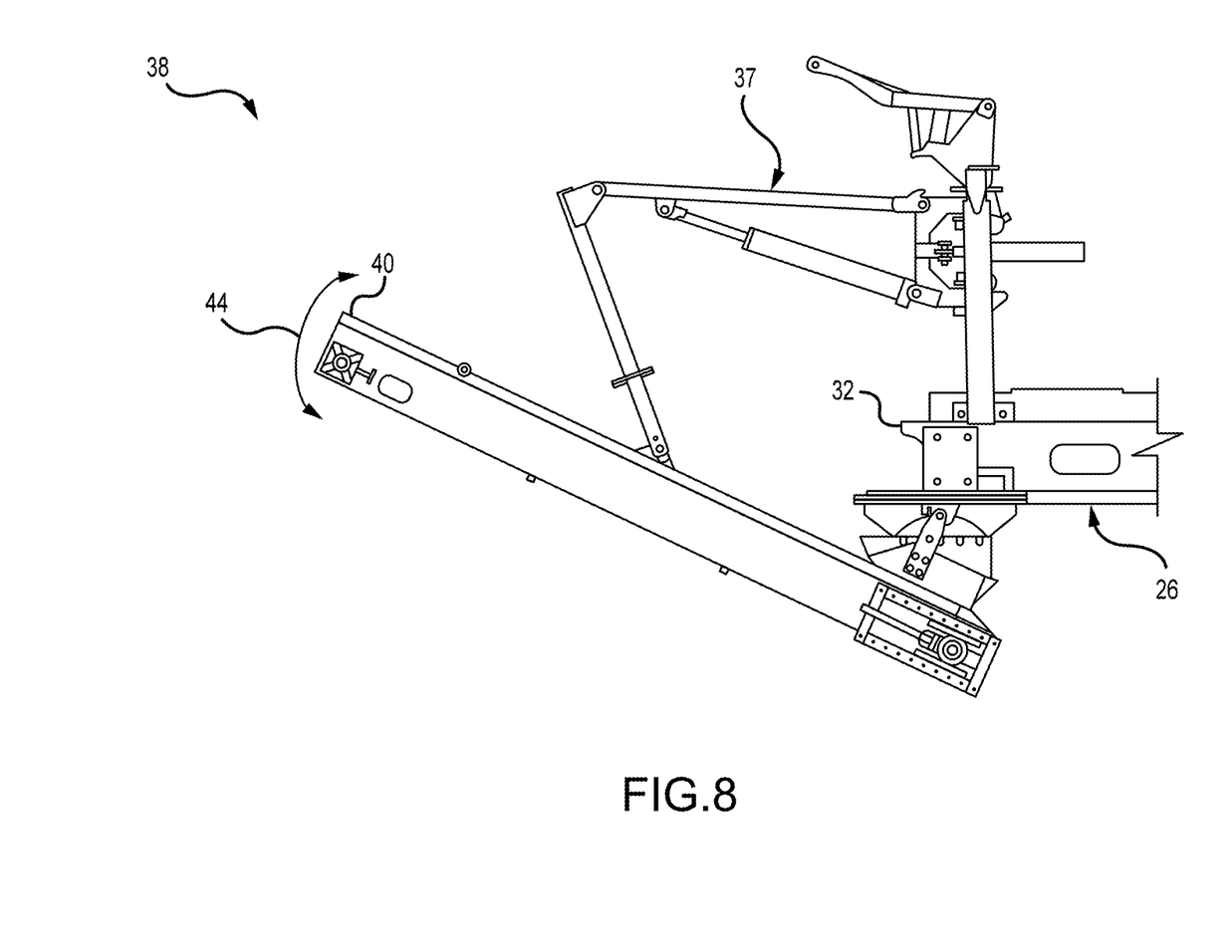
FIG. 8 is a side view of a secondary conveyor system that may be used in conjunction with the material removal system.

Referring now to FIGS. 1 and 8 simultaneously, and as briefly mentioned earlier, material removal system 10 also may be provided with a secondary conveyor system 38. Secondary conveyor system 38 may be used in addition to, or as a substitute for, material collection system 34. Secondary conveyor system 38 may be mounted adjacent discharge end 32 of conveyor system 26 so that secondary conveyor system 38 receives excavated material 12 discharged thereby. Secondary conveyor system 38 may be pivotally mounted with respect to conveyor system 26, e.g., by support frame assembly 37 so that material discharge end 40 of secondary conveyor system 38 is moveable horizontally (i.e., in the directions indicated by arrows 42, as best seen in FIG. 1) and/or vertically (i.e., in the directions indicated by arrows 44) with respect to material discharge end 32 of conveyor system 26. Horizontal movement (i.e., in the directions of arrows 42) of material discharge end 40 of secondary conveyor system 38 allows material discharge end 40 to be swung in an arc between the left and right-hand sides of conveyor system 26. Vertical movement (i.e., in the directions of arrows 44) of material discharge end 40 of secondary conveyor system 38 allows material discharge end 40 to be raised and lowered with respect to material discharge end 32 of conveyor system 26. Secondary conveyor system 38 therefore allows excavated material 12 to be discharged into a truck or trailer (not shown) positioned alongside (e.g., either to the left or right) of material removal system 10. Use of secondary conveyor system 38 along with a movable truck or trailer allows material removal system 10 to be moved along the pile of excavated material 12 substantially continuously, i.e., along with the movement of the continuous excavator of the trenching process. In other embodiments, material collection system 34 may be positioned adjacent discharge end 40 of secondary conveyor system 38 to collect discharged excavated material 12 into removable containers 36 in the manner already described for conveyor system 26.

Figure 6:
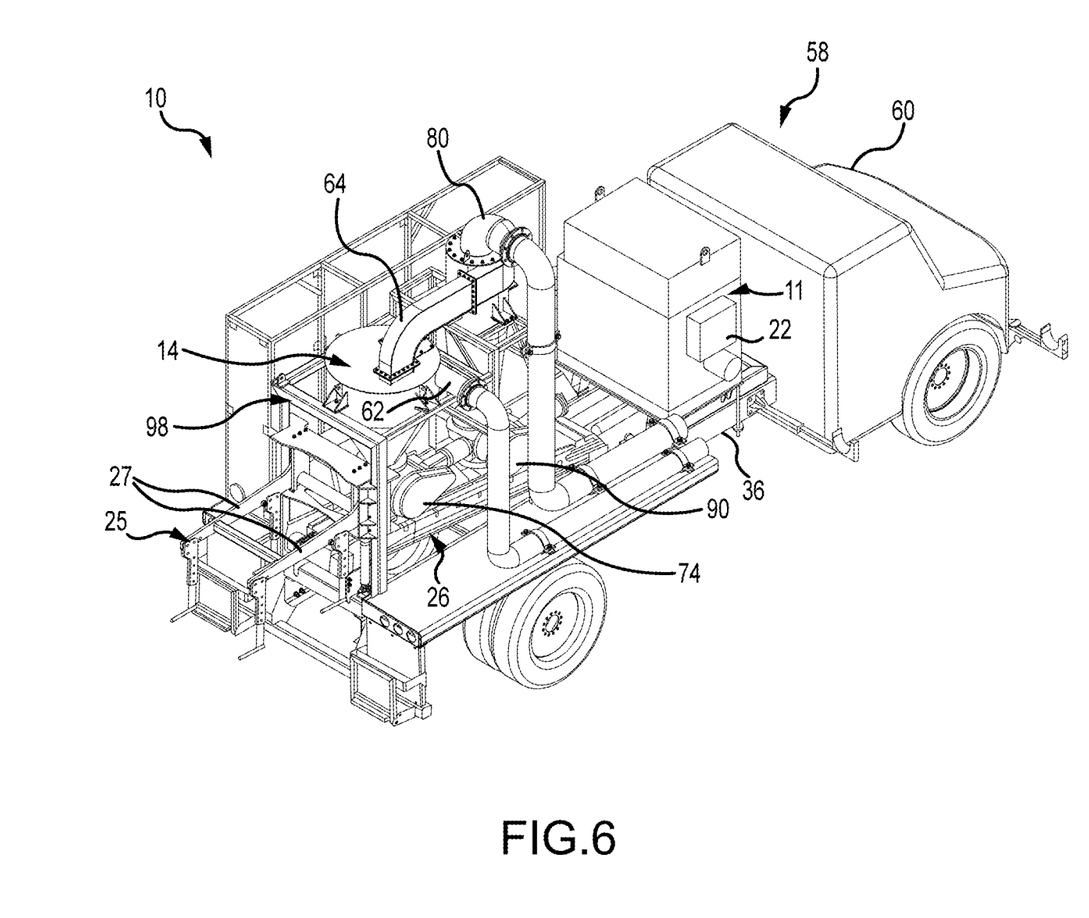
FIG. 6 is a right side view in perspective of the material removal system illustrated in FIG. 2 with the right-hand side storage compartment removed to more clearly show the components of the material removal system and support frame.
Figure 7:
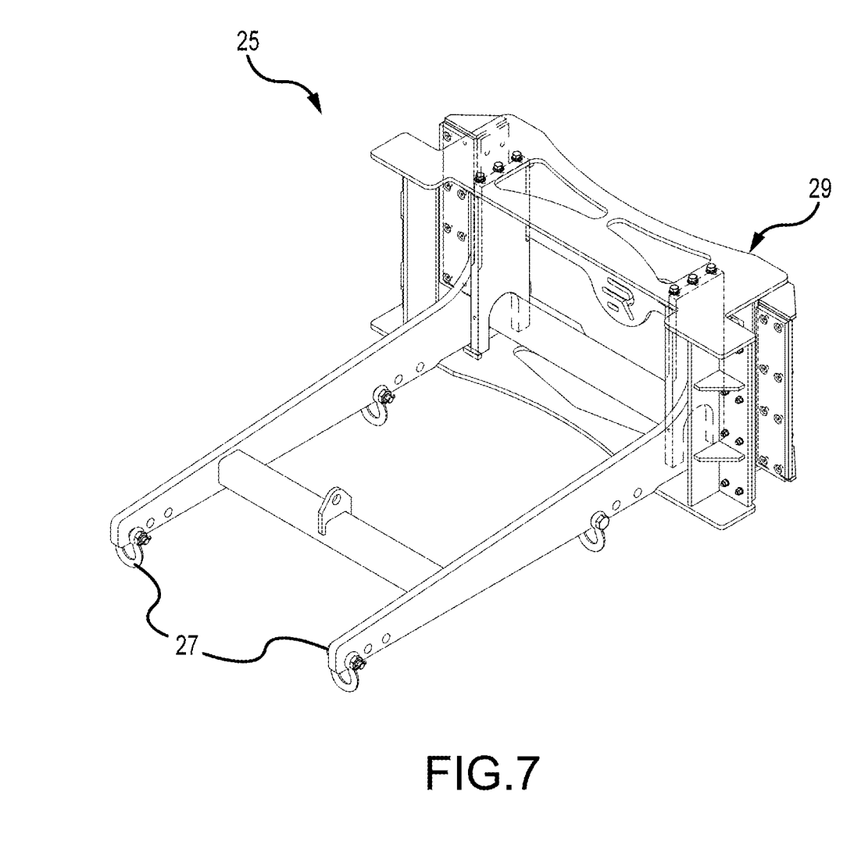
FIG. 7 is a perspective view of an embodiment of a container support system that may be used in conjunction with the material removal system.

The various components, systems, and devices comprising material removal system 10 may be mounted to one or more support frames 98, as best seen in FIGS. 4-6. Support frame 98 may be configured to be mounted to a chassis 35 of vehicle 58, thereby allowing material removal system 10 to move along with the continuous (e.g., micro trenching) excavator and to allow system 10 to be moved from site-to-site. In other embodiments, support frame 98 may be configured to be mounted to a trailer (not shown), again to provide mobility and allow material removal system 10 to be moved from site-to-site. In such an embodiment, support frame 98 may comprise the trailer itself, and may include at least two road wheels and a tongue (not shown).

The various components, systems, and devices comprising material removal system 10 may be powered by any convenient power system, or combination of power systems, such as hydraulic, pneumatic, and electric power systems, as may be required or desired depending on the particular systems involved. In some embodiments, the power requirements of the various components of material removal system 10 may be in excess of several hundred kilowatts, such as, for example, about 150 KW (about 200 horsepower). In such embodiments, and wherein material removal system 10 is mounted to a truck chassis 35, it may be desired, but not required, to power the various components via a suitable power take-off (PTO) system provided on the engine of vehicle 58. Alternatively, of course, other arrangements, such as the provision of a separate power source or 'pony' engine, could also be used. If used, the separate power source or engine may be mounted separately on the truck chassis 35 (in embodiments wherein material removal system 10 is mounted to a vehicle 58) or to the support frame 98 of material removal system 10. In embodiments wherein material removal system 10 is provided on a trailer, the separate power source or engine may be mounted to the trailer or to support frame 98 of material removal system 10.

Referring now to FIG. 1, with occasional reference to FIGS. 2, 3, and 8, material removal system 10 may be used as follows in a trenching, such as a micro trenching process. After the material removal system 10 has been provided at the job site of the micro trenching operation, air pump 22 may be operated to initiate a flow of air through material removal system 10. Operation of air pump 22 will draw air 24 into distal end 20 of collection conduit 18. When distal end 20 of collection conduit 18 is positioned adjacent excavated material 12, air 24 entering distal end 20 will pick-up and entrain quantities of excavated material 12, carrying it to primary particle separator system 14 as loaded air stream 46. Primary particle separator system 14 separates quantities of excavated material 12 entrained in loaded air stream 46, resulting in the formation of a partially-loaded air stream 48. In embodiments wherein primary particle separator system 14 is provided with cut size larger than that of secondary particle separator system 16, excavated material 12 removed by primary particle separator system 14 will typically comprise a coarse fraction of excavated material 12, although it may also contain some amount of finer particles as well. Excavated material 12 removed by secondary particle separator system 16 will typically comprise a fine fraction of excavated material 12.

In any event, separated excavated material 12 from primary particle separator system 14 is ultimately discharged via material discharge port 28, whereupon it is carried away by conveyor system 26 before being discharged or deposited into container 36 of material collection system 34. See also FIGS. 2 and 3. Alternatively, in embodiments having secondary conveyor system 38 (FIGS. 1 and 8), excavated material 12 from primary particle separator system 14 may be carried away by secondary conveyor system 38.

Partially-loaded air stream 48 exiting outlet 64 of primary particle separator system 14 will still contain some amount of excavated material 12 entrained therein (e.g., the fines fraction). Upon entering inlet 78 of secondary particle separator system 16, e.g., as partially loaded air stream 48, secondary particle separator system 16 will thereafter separate additional quantities of excavated material entrained in partially loaded air stream 62, resulting in the formation of a barren or depleted air stream 50. Excavated material 12 separated by secondary particle separator system 16 is ultimately discharged via material discharge port 30, whereupon it is carried away by conveyor system 26 before being discharged or deposited into container 36 of material collection system 34. Thereafter, barren or depleted air stream 50 enters inlet 52 of air pump system 22, either directly or via particulate filter 94 (if provided) before being discharged to the atmosphere via outlet 54 as filtered or discharged stream 56.

Unless defined otherwise, all technical and scientific terms used herein have the same meaning as commonly understood by persons having ordinary skill in the art to which the invention pertains. Although any systems, methods, and materials similar or equivalent to those described herein can be used in practice for testing of the present invention, the preferred systems, methods, and materials are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention.

The invention shall therefore only be construed in accordance with the following claims:

1. A material removal system for removing particulate material, comprising:
   a vehicle;
   a primary particle separator system mounted to said vehicle, said primary particle separator system having an inlet, an outlet, and a material discharge port, said primary particle separator system separating quantities of particulate material entrained in an air stream entering the inlet of said primary particle separator system;
   a collection conduit having a proximal end and a distal end, the proximal end of said collection conduit being operatively connected to the inlet of said primary particle separator system, the distal end of said collection conduit being positionable adjacent the particulate material;
   a secondary particle separator system having an inlet, an outlet, and a material discharge port, the inlet of said secondary particle separator system being operatively connected to the outlet of said primary particle separator system, said secondary particle separator system separating additional quantities of particulate material entrained in an air stream exiting the outlet of said primary particle separator system;

an air pump having an inlet and an outlet, the inlet of said air pump being operatively connected to the outlet of said secondary particle separator system; and a conveyor system operatively associated with the material discharge ports of said primary and secondary particle separator systems, said conveyor system collecting separated particulate material from the material discharge ports of said primary and secondary particle separator systems and transporting the separated particulate material to a material discharge end of said conveyor system.

2. The system of claim 1, further comprising a pony engine mounted operatively associated with said air pump and said conveyor system, said pony engine providing power to operate said air pump and said conveyor system.

3. The system of claim 2, wherein each of said air pump and said conveyor system are hydraulically powered, and wherein said material removal system further comprises a hydraulic pump operatively connected to each of said pony engine, said air pump, and said conveyor system.

4. The system of claim 2, wherein each of said air pump and said conveyor system are electrically powered, and wherein said material removal system further comprises an electric generator operatively connected to each of said pony engine, said air pump, and said conveyor system.

5. A material removal system for removing particulate material, comprising:

a collection conduit having a proximal end and a distal end, the distal f said collection conduit being positionable adjacent the particulate material;

a primary cyclone separator having an inlet, an outlet, and a material discharge port, the inlet of said primary cyclone separator being operatively connected to the proximal end of said collection conduit, said primary cyclone separator having a first particle size cut point so that said primary cyclone separator separates quantities of particulate material entrained in an air stream entering the inlet of said primary particle separator system having particle sizes that are generally larger than the first particle size cut point;

a secondary cyclone separator having an inlet, an outlet, and a material discharge port, the inlet of said secondary cyclone separator being operatively connected to the outlet of said primary cyclone separator, said secondary particle separator system having a second particle size cut point that is smaller than the first particle size cut point of said primary cyclone separator so that said secondary cyclone separator separates additional quantities of particulate material entrained in an air stream exiting the outlet of said primary particle separator system having particle sizes that are generally larger than the second particle size cut point;

a particulate filter having an inlet operatively connected to the outlet of said secondary cyclone separator an air pump having an inlet and an outlet, the inlet of said air pump being operatively connected to an outlet of said particulate filter;

a conveyor system operatively associated with the material discharge ports of said primary and secondary cyclone separators, said conveyor system collecting separated particulate material from the material discharge ports of said primary and secondary cyclone separators and transporting the separated particulate material to a material discharge end of said conveyor system; and a removable container operatively associated with the material discharge end of said conveyor system, said removable container holding a defined quantity of separated particulate material discharged by the material discharge end of said conveyor system.

6. The system of claim 5, wherein said removable container comprises a flexible bag.

7. A material removal system for removing particulate material, comprising:

a collection conduit having a proximal end and a distal end, the distal end of said collection conduit being positionable adjacent the particulate material;

a primary particle separator system having an inlet, an outlet, and a material discharge port, the inlet of said primary particle separator system being operatively connected to the proximal end of said collection conduit, said primary particle separator system separating quantities of particulate material entrained in an air stream entering the inlet of said primary particle separator system;

a secondary particle separator system having an inlet, an outlet, and a material discharge port, the inlet of said secondary particle separator system being operatively connected to the outlet of said primary particle separator system, said secondary particle separator system separating additional quantities of particulate material entrained in an air stream exiting the outlet of said primary particle separator system;

an air pump having an inlet and an outlet, the inlet of said air pump being operatively connected to the outlet of said secondary particle separator system; and a conveyor system operatively associated with the material discharge ports of said primary and secondary particle separator systems, said conveyor system collecting separated particulate material from the material discharge ports of said primary and secondary particle separator systems and transporting the separated particulate material to a material discharge end of said conveyor system.

8. The system of claim 7, further comprising a material collection system operatively associated with the material discharge end of said conveyor system, said material collection system receiving the separated particulate material from the material discharge end of said conveyor system.

9. The system of claim 7, wherein said material collection system further comprises at least one container, said container holding a defined quantity of particulate material.

10. The system of claim 9, wherein said material collection system further comprises a container support system for holding said container adjacent the material discharge end of said conveyor system.

11. The system of claim 9, wherein said container comprises a bag.

12. The system of claim 7, further comprising a secondary conveyor system movably mounted with respect to said conveyor system, said secondary conveyor system receiving the separated particulate material from the material discharge end of said conveyor system and transporting the separated particulate material to a material discharge end of said secondary conveyor system.

13. The system of claim 12, wherein the secondary conveyor system comprises a belt conveyor.

14. The system of claim 12, wherein the material discharge end of said secondary conveyor system is moveable horizontally with respect to the material discharge end of said conveyor system.

15. The system of claim 12, wherein the material discharge end of said secondary conveyor system is moveable vertically with respect to the material discharge end of said conveyor system.

16. The system of claim 7, wherein said primary particle separator system comprises a primary cyclone separator.

17. The system of claim 16, further comprising a primary airlock valve operatively connected to the material discharge port of said primary cyclone separator, said primary airlock valve discharging the separated particulate material to said conveyor system.

18. The system of claim 16, further comprising a primary vibrator system operatively associated with said primary cyclone separator, said primary vibrator system vibrating said primary cyclone separator.

19. The system of claim 7, wherein said secondary particle separator system comprises a secondary cyclone separator.

20. The system of claim 19, further comprising a secondary airlock valve operatively connected to the material discharge port of said secondary cyclone separator, said secondary airlock valve discharging the separated particulate material to said conveyor system.

21. The system of claim 19, further comprising a secondary vibrator system operatively associated with said secondary cyclone separator, said secondary vibrator system vibrating said secondary cyclone separator.

22. The system of claim 7, wherein said conveyor system comprises a belt conveyor.

23. The system of claim 7, further comprising a particulate filter fluidically positioned between the outlet of said secondary particle separator system and the inlet of said air pump.

24. The system of claim 7, further comprising a support frame, and wherein at least said primary particle separator system, said secondary particle separator system, and said conveyor system are operatively mounted to said support frame.

25. The system of claim 24, wherein said support frame is configured to be mounted to a vehicle chassis.

26. The system of claim 24, wherein said support frame is configured to be mounted to a trailer.

27. A method, comprising:
providing the material removal system of claim 1;
operating the air pump of the system to initiate a flow of air through the primary and secondary particle separator systems; and
positioning the distal end of the collection conduit adjacent the particulate material so that the particulate material is entrained with air drawn into the inlet of the primary particle separator system, wherein the particulate material is separated from the air by the primary and secondary particle separator systems and substantially continuously discharged by the conveyor system.

28. The method of claim 27, wherein the material removal system further comprises a material collection system operatively associated with the material discharge end of the conveyor system, the material collection system having a container operatively associated therewith for receiving particulate material discharged by the conveyor system, the container holding a defined quantity of particulate material therein, and wherein said method comprises periodically removing a loaded container and replacing it with an empty container.

29. The method of claim 27, wherein the material removal system further comprises a secondary conveyor system movably mounted with respect to the conveyor system, and wherein said method comprises moving a discharge end of the secondary conveyor system to discharge particulate material into a collection receptacle positioned adjacent the system.

30. The method of claim 27, further comprising positioning the material removal system nearby a moving continuous excavator, the moving continuous excavator producing particulate material, and wherein said positioning the distal end of the collection conduit further comprises positioning the distal end of the collection conduit adjacent the particulate material.

* * * * *